Patented July 25, 1933

1,919,298

UNITED STATES PATENT OFFICE

RUDOLF LEHMANN, OF UERDINGEN-ON-THE-RHINE, FRANZ HECKMANNS AND KARL DOBMAIER, OF LEVERKUSEN-ON-THE-RHINE, AND JAKOB WILLEMS, OF CREFELD, GERMANY, ASSIGNORS TO WINTHROP CHEMICAL COMPANY, INC., OF NEW YORK, N. Y., A CORPORATION OF NEW YORK

DISINFECTANT

No Drawing. Application filed May 13, 1930, Serial No. 452,130, and in Germany May 15, 1929.

This invention relates to new disinfectant products.

In accordance with the present invention objects exposed to infection by micro-organisms or already infected thereby are rendered resistant to or free therefrom by treating said objects in either a dry or a wet process with an additional compound obtainable by combining an aromatic hydroxy compound as such or in the form of its alkali-metal salts, such as dichlorophenol, trichlorophenol, trichlorocresol, tetrachlorophenol on with an aliphatic amine or a substitution product thereof such as amino-isopropylalcohol, mono-, di- or trihydroxylthylamine, monopropanolamine, and so on. Substances of this type suitable for the object in view are described in the literature, for example in Chemie in Einzeldarstellungen, Vol. XI., 1922, Organische Molekülverbindungen von Paul Pfeiffer, page 258 sequ.; they are obtainable by melting or dissolving together one molecular proportion of the phenol compound with one or two molecular proportions of the aliphatic amine. The compounds thus produced are stable colorless crystalline powders, easily soluble in water and organic solvents, such as alcohol, benzine, acetone, pyridine and so on.

These substances, especially in an aqueous solution, are highly efficacious against plant pests and micro-organisms such as bacteria, moulds and the like with the result that they can likewise be employed, for all purposes of preserving or disinfecting, for example the immunizing of grain or the like, the preservation of wood, the prevention of mildew formation, in the preservation of starch paste, gelatine, sizing materials, solutions of glue, gum arabic, dextrine, cosmetics as well as blood, pus and the like.

According to the specific material to be disinfected these compounds are applied in the various ways, as can be seen from the examples. The quantities of the disinfectants to be added may vary within wide limits. On carrying out our new invention suitable concentrations will be found by those skilled in the art.

The invention is illustrated by the following examples:

*Example 1.*—50 parts by weight of trichlorophenol and 50 parts by weight of aminoisopropylalcohol are homogenized by melting together. This mixture is miscible with water in any proportion. For instance solutions of from 0.1 to 0.2 per cent strength are suitable for preserving or disinfecting technical products, such as glue, gelatine, sizing materials, starch paste, wood and the like. These aqueous solutions may also be used as disinfectants against bacteria and the like.

*Example 2.*—A mixture of 70 parts by weight of trichlorocresol and 30 parts by weight of aminoethylalcohol is liquefied by heating and intimately mixed. This mixture is diluted with water to form a 0.1 to 0.2% solution which represents a highly efficacious agent in the preservation of starch paste.

*Example 3.*—40 parts by weight of trichlorophenol are dissolved in 60 parts by weight of a mixture from mono-, di- and trihydroxyethylamine. This solution is diluted with water to a clear solution as given in Examples 1 and 2 and then can be used for the same purposes as mentioned in these preceding examples.

*Example 4.*—40 parts by weight of caustic soda lye, 197 parts by weight of trichlorophenol, 94.8 parts by weight of water and 142.2 parts by weight of monoethanolamine yield a solution of the additional compound from the sodium salt of trichlorophenol and the amine, in a highly stable form. This solution may be used as disinfectant, especially in the preservation of starch paste.

*Example 5.*—163 parts by weight of 2.6-dichlorophenol, 40 parts by weight of sodium hydroxide, 333 parts by weight of monopropanolamine and 204 parts by weight of water yield a stable solution, which may be employed for the same purpose as mentioned above.

*Example 6.*—232 parts by weight of 2, 3, 4,6-tetrachlorophenol, 40 parts by weight of sodium hydroxide, 150 parts by weight of monoethanolamine, 75 parts by weight of diethanolamine and 135 parts by weight of water yield a stable solution suitable for disinfecting purposes.

We claim:

1. As a new disinfectant an additional compound of an aromatic hydroxy compound with an aliphatic amino alcohol, which may be substituted in the amino group by one or more hydroxyalkyl groups.

2. As a new disinfectant an additional compound of a polyhalogenated aromatic hydroxy compound with an aliphatic amino alcohol.

3. As a new disinfectant a concentrated aqueous solution prepared from one molecular proportion of an alkali-metal salt of trichlorophenol and two molecular proportions of monoethanolamine.

RUDOLF LEHMANN.
FRANZ HECKMANNS.
KARL DOBMAIER.
JAKOB WILLEMS.